United States Patent [19]

Nakamura et al.

[11] Patent Number: 5,508,316
[45] Date of Patent: Apr. 16, 1996

[54] RESIN COMPOSITION CAPABLE OF EXHIBITING HIGH MELT VISCOELASTICITY, AROMATIC POLYESTER RESIN FOAMED BODY PRODUCED THEREFROM AND PROCESS FOR PRODUCING THE FOAMED BODY

[75] Inventors: Masaaki Nakamura; Kenji Mogami, both of Settsu; Tadashi Koyama, Amagasaki; Tomomi Nakashima, Settsu; Akiyoshi Somemiya, Kobe, all of Japan

[73] Assignee: Kanegafuchi Kagaku Kogyo Kabushiki Kaisha, Osaka, Japan

[21] Appl. No.: 507,230

[22] Filed: Aug. 22, 1995

[30] Foreign Application Priority Data

Dec. 24, 1993 [JP] Japan ................................. 5-328807

[51] Int. Cl.⁶ ....................................................... C08J 9/00
[52] U.S. Cl. ......................... 521/182; 521/138; 528/272; 528/300
[58] Field of Search ................................... 528/272, 300; 521/182, 138

[56] References Cited

U.S. PATENT DOCUMENTS

| | | | |
|---|---|---|---|
| 4,772,652 | 9/1988 | Yoshifumi et al. | 528/272 |
| 4,906,729 | 3/1990 | Greene et al. | 528/272 |
| 4,931,538 | 6/1990 | Yoshifumi et al. | 528/272 |
| 5,021,545 | 6/1991 | Nakane et al. | 528/272 |
| 5,075,417 | 12/1991 | Trowell et al. | 521/182 |
| 5,250,333 | 10/1993 | McNeely et al. | 528/272 |

FOREIGN PATENT DOCUMENTS

| | | |
|---|---|---|
| 63-75056 | 4/1988 | Japan . |
| 1-153746 | 6/1989 | Japan . |
| 3-199243 | 3/1991 | Japan . |

*Primary Examiner*—Morton Foelak
*Attorney, Agent, or Firm*—Armstrong, Westerman, Hattori, McLeland & Naughton

[57] ABSTRACT

There are disclosed a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule, and an aromatic polyester resin foamed body produced therefrom and a process for producing the foamed body.

7 Claims, 1 Drawing Sheet

RESIN COMPOSITION CAPABLE OF EXHIBITING HIGH MELT VISCOELASTICITY, AROMATIC POLYESTER RESIN FOAMED BODY PRODUCED THEREFROM AND PROCESS FOR PRODUCING THE FOAMED BODY

TECHNICAL FIELDS

The present invention relates to a resin composition capable of exhibiting a high melt viscoelasticity, a polyester resin foamed body produced therefrom and a process for producing the foamed body, and more particularly to an aromatic polyester resin foamed body which can be suitably used as, for instance, a heat-resistant container, a heat-insulatant container, a cushioning and wrapping material and the like and a process for producing the foamed body, and a resin composition capable of exhibiting a high melt viscoelasticity which is useful for the foamed body.

BACKGROUND ART

A linear aromatic polyester resin such as polyethylene terephthalate is excellent in mechanical properties, heat resistance, chemical resistance, dimensional stability and the like. Therefore, the linear aromatic polyester resin is used in various uses such as an injection molded article, a blow molded article, a film and a fiber. However, when the linear aromatic polyester resin is used, its viscoelasticity is insufficient during melting for carrying out extrusion foaming. Therefore, there is a defect that it is extremely difficult to obtain a good foamed body.

As a method for obviating the above defect, it is proposed that the melt viscosity of an aromatic polyester resin is increased by a method comprising mixing a diepoxy compound, and calcium stearate or sodium carbonate with a linear aromatic polyester resin during carrying out extrusion foaming (Japanese Unexamined Patent Publication No. 24364/1978), a method comprising mixing a diepoxy compound, and a montan wax salt or a montan wax ester salt with the resin (Japanese Unexamined Patent Publication No. 50568/1979), a method comprising mixing a polyfunctional glycidyl ester and a polyfunctional carboxylic acid anhydride with the resin (Japanese Examined Patent Publication No. 16977/1991), or the like.

However, when such a diepoxy compound or the like is used, there is an effect that melt viscosity is increased, but a defect such that a colored foreign matter is easily generated is pointed out.

Also, a method comprising mixing a compound having at least two acid anhydride groups in its molecule with the resin (Japanese Examined Patent Publication No. 15736/1993) and a method comprising mixing the same acid anhydride as the above in combination with a specific metallic compound, with the resin (Japanese Examined Patent Publication No. 47575/1993) are proposed.

The melt viscosity of the composition obtained by mixing these linear aromatic polyester resin and acid anhydride is once increased. However, remarkable lowering of the viscosity is generated when kneading is continued, so that its melt viscosity does not become stable. Therefore, there arises a problem that a foamed body cannot be produced in a stable state.

The present invention has been accomplished in consideration of the above prior art, and aims at providing a foamed body having uniform and fine cells, having a high expansion ratio and being excellent in cushioning property, mechanical properties and heat resistance, and a process for stably producing the foamed body, and a resin composition useful for the foamed body.

DISCLOSURE OF THE INVENTION

The present invention relates to ① a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule, ② a process for producing an aromatic polyester resin foamed body, characterized by melting a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule, thereafter mixing the resulting melt with a blowing agent, then extruding the resulting mixture into a low pressure zone and foaming the mixture, and ③ an aromatic polyester resin foamed body having a density of at most 0.3 g/cm$^3$, which is obtained by melting a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule, thereafter mixing the resulting melt with a blowing agent, then extruding the resulting mixture into a low pressure zone and foaming the mixture.

BEST MODE FOR CARRYING OUT THE INVENTION

Figure 1:
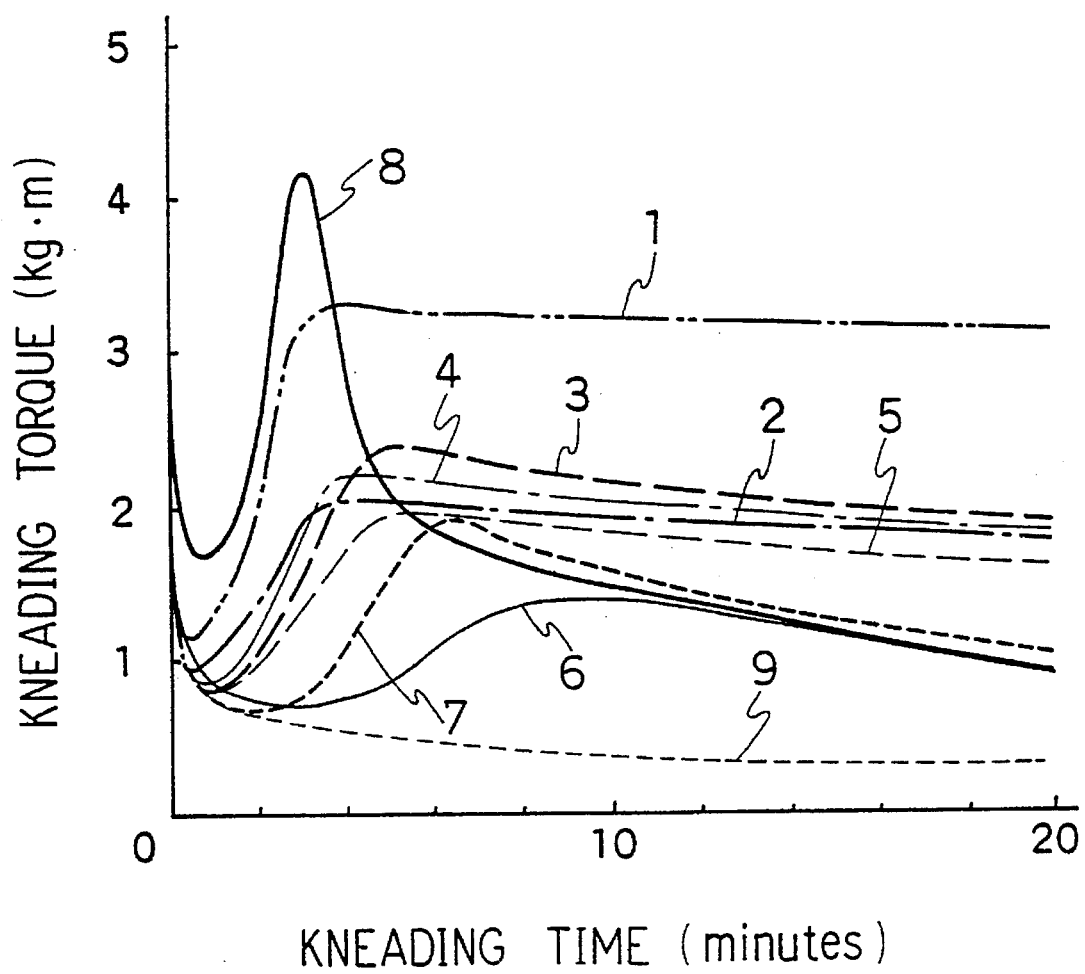
FIG. 1 is a graph showing the change of kneading torque of the resin compositions obtained in Examples 1 to of the present invention and Comparative Examples 1 to 4 with the passage of time.

The composition capable of exhibiting a high melt viscoelasticity of the present invention is a composition suitably used for an aromatic polyester resin foamed body obtained by melting the composition in a molding machine, mixing the composition with a blowing agent, thereafter extruding the resulting mixture into a low pressure zone and foaming the mixture, and comprises an aromatic copolyester resin which contains a branching component unit having at least three ester-forming groups in the ratio, of 0.01 to 5 moles per 100 moles in total of aromatic dicarboxylic acid units and which has a limiting viscosity of 0.4 to 1.0 dl/g (hereinafter also referred to as aromatic copolyester resin), and a compound having at least two acid anhydride groups in its molecule.

The above compound having at least two acid anhydride groups in its molecule increases viscoelasticity of the composition of the present invention during melting through its reaction with the aromatic copolyester resin. The reason why viscoelasticity thus increases is thought to be based upon a bond generated by the reaction of hydroxyl group existed in the molecule of a specific aromatic copolyester resin with an acid anhydride group.

On the other hand, the aromatic copolyester resin minimizes the lowering of viscosity when continuing the melting and kneading of the composition of the present invention for a long period of time, and stably maintains an increased melt viscoelasticity. Generally, when a compound having at least two acid anhydride groups in its molecule is added to a linear thermoplastic polyester resin, melt viscoelasticity of the thermoplastic polyester resin is once increased. However, when melting and kneading are continued, the viscosity is remarkably lowered.

On the contrary, as to the composition of the present invention, the restraint of the lowering of viscosity is thought to be based upon that a branch is existed in a specific aromatic copolyester resin used therein.

The aromatic copolyester resin which contains a barnching component unit having at least three, preferably three to six ester-forming groups in the ratio of 0.01 to 5 moles per 100 moles in total of the aromatic dicarboxylic acid units, used in the present invention, is a branched aromatic copolyester obtained by polycondensation of an aromatic dicarboxylic acid component, a diol component and a branching component. The above aromatic dicarboxylic acid unit is an aromatic dicarboxylic acid unit composing an ester linkage.

The above branched aromatic copolyester can be easily prepared by a usual process for preparing polyester. For instance, there can be obtained a branched aromatic copolyester whose molecular weight is increased in accordance with the elimination of a volatile product by mixing a desired aromatic dicarboxylic acid component, a diol component and a branching component in a molten state, and allowing to keep them under high vacuum to the extent of 0.2 to 1.0 mmHg for 3 to 12 hours or so. Also the copolyester can be obtained by mixing a linear polyester comprising a desired aromatic dicarboxylic acid component and a diol component, with a branching component in a molten state, carrying out their transesterification, and thereafter eliminating a volatile product therefrom under high vacuum.

As concrete examples of the above aromatic dicarboxylic acid component, there can be cited, for instance, terephthalic acid, isophthalic acid, naphthalenedicarboxylic acid, diphenyl ether dicarboxylic acid, diphenyl sulfone dicarboxylic acid, diphenoxyethanedicarboxylic acid, and the like. These can be used alone or in an admixture thereof. Among the above aromatic dicarboxylic acid components, terephthalic acid is preferable from the viewpoint of high industrial utility and easiness of handling.

As concrete examples of the above diol component, there can be cited, for instance, ethylene glycol, propylene glycol, butanediol, neopentylene glycol, hexamethylene glycol, cyclohexane dimethylol, tricyclodecane dimethylol, 2,2-bis(4-β-hydroxyethoxyphenyl)propane, 4,4'-bis(β-hydroxyethoxy)diphenylsulfone, and the like. These can be used alone or in an admixture thereof. Among the above diol components, ethylene glycol and butanediol are preferable from the viewpoint of high industrial utility and easiness of handling.

The above branching component can be a compound which makes a branch at either a part of a dicarboxylic acid unit or a part of a glycol unit which constitutes the ester linkage of a polyester. The branch is based upon that the branching component has at least three of hydroxyl groups and carboxyl groups which are ester-forming groups.

As concrete examples of the above branching component, there can be cited, for instance, tri- or tetracarboxylic acids such as trimellitic acid and pyromellitic acid and lower alkyl esters thereof, tri- or tetraols such as glycerol, trimethylolpropane, trimetylolethane and pentaerythritol, a dihydroxyl carboxylic acid a hydroxyl dicarboxylic acid and derivatives thereof, and the like. These can be used alone or admixture thereof. Among the above branching components, glycerol is preferable for the reason that it is easy to control the degree of polymerization of the aromatic copolyester resin.

As mentioned above, the aromatic copolyester resin used in the present invention contains a branching component unit in the ratio of 0.01 to 5 moles, preferably 0.1 to 3 moles, more preferably 0.5 to 3 moles per 100 moles in total of the aromatic dicarboxylic acid units. When the content of the above branching component unit is less than the above range, the effect that increased melt viscoelasticity is stably maintained, which is an effect shown by the resin composition capable of exhibiting a high melt viscoelasticity of the present invention, becomes insufficient. Also, when the content of the above branching component unit exceeds the above range, melt processing of the resin composition capable of exhibiting a high melt viscoelasticity of the present invention does not become easy.

The limiting viscosity (a is value which is measured at 23° C., using a mixture of phenol/tetrachloroethane=1/1 (weight ratio) as a solvent) of the aromatic copolyester resin used in the present invention is 0.4 to 1.0 dl/g, preferably 0.5 to 1.0 dl/g. When the limiting viscosity is lower than the above range, the effect shown by the generation of a branch becomes insufficient, and when the limiting viscosity is higher than the above range, melt molding does not become easy.

Moreover, as the above aromatic copolyester resin, the above aromatic copolyester resin (hereinafter also referred to as resin (A)) may be used alone or in an admixture thereof by mixing a linear aromatic polyester resin (hereinafter also referred to as resin (B)) therewith.

The above resin (B) is prepared by carrying out polycondensation of the same aromatic dicarboxylic acid component and diol component as the components used in the preparation of the above aromatic copolyester resin, and used in order to adjust the content of the branching component unit contained in the aromatic copolyester resin to a desired range in accordance with its uses.

The limiting viscosity of the above resin (B) is preferably 0.4 to 1.0 dl/g, more preferably 0.5 to 1.0 dl/g. When the limiting viscosity is lower than the above range, there are tendencies that it becomes difficult to increase the melt viscoelasticity of the composition of the present invention prepared by using the resin (B) and that it becomes difficult to sufficiently maintain the increased melt viscoelasticity. When the limiting viscosity is higher than the above range, there is a tendency that melt molding does not become easy.

As particularly preferable ones among the above resin (B), there can be cited, for instance, polyethylene terephthalate, polyethylene naphthalenedicarboxylate, and the like.

The ratio of the above resin (B) to the above resin (A) can be adjusted so that the branching component unit having at least three ester-forming groups is within the ratio of 0.01 to 5 moles per 100 moles in total of the aromatic dicarboxylic acid units contained in the resin (A) and the resin (B) in accordance with the amount of the branching component unit contained in the resin (A). The amount of the resin (B) is usually 0 to 1000 parts (parts by weight, hereinafter referred to the same), preferably 0 to 500 parts per 100 parts of the resin (A).

The compound having at least two acid anhydride groups in its molecule, which is used in the present invention, is not particularly limited when the compound has at least two acid anhydride groups in its molecule. Moreover, from the viewpoint of reactivity, pyromellitic dianhydride, naphthalenetetracarboxylic dianhydride, benzophenonetetracarboxylic dianhydride, cyclopentanetetracarboxylic dianhydride, ethylene glycol-bis(anhydrotrimellitate), glycerol-tris(anhydrotrimellitate), and the like are preferable. Also, from the viewpoint of easiness of handling, pyromellitic dianhydride and benzophenonetetracarboxylic dianhydride are more preferable. These compounds having at least two acid anhydride groups in its molecule are usually used alone or in an admixture thereof.

In the present invention, the compound having at least two acid anhydride groups in its molecule is used in the ratio of 0.50 to 5 parts, preferably 0.1 to 3 parts, more preferably 0.2 to 2 parts per 100 parts of the above aromatic copolyester resin. When the ratio of the compound having at least two acid anhydride groups in its molecule is less than the above range, the melt viscoelasticity of the composition of the present invention cannot be increased up to a melt viscoelasticity which is suitable for extrusion foaming, so that good extrusion foaming cannot be carried out. Also, when the ratio is larger than the above range, gelation of a resulting resin composition proceeds to excessively increase the melt viscoelasticity, so that good extrusion foaming cannot be carried out.

The aromatic polyester resin foamed body of the present invention is obtained by melting the resin composition capable of exhibiting a high melt viscoelasticity comprising 100 parts of the above aromatic copolyester resin and 0.05 to 5 parts of the compound having at least two acid anhydride groups in its molecule, thereafter mixing the resulting melt with a blowing agent, then extruding the resulting mixture into a low pressure zone and foaming the mixture.

In the production of the polyester resin foamed body of the present invention, there can be used, for instance, an extrusion molding machine such as a single-screw extruder, a multi-screw extruder or a tandem extruder, a blow molding machine, an injection molding machine, and the like. When these molding machines are used, a foamed body obtained by melting the resin composition capable of exhibiting a high melt viscoelasticity in the above molding machine, mixing the resulting melt with a blowing agent, and thereafter extruding the resulting mixture from a nozzle into a low pressure zone.

A foamed body can be produced by, for instance, the following methods when explaining with the resin composition capable of exhibiting a high melt viscoelasticity comprising the above resin (A) and the above compound having at least two acid anhydride groups in its molecule as an example.

① a method comprising mixing a compound having at least two acid anhydride groups in its molecule with a pellet of the resin (A) at a temperature of at most the melting point of both components, and thereafter supplying the resulting mixture to a molding machine ② a method comprising previously melting and part of the resin (A) with a compound having at least two acid anhydride groups in its molecule to give a pellet, mixing this pellet with the remaining resin (A) and thereafter supplying the resulting mixture to a molding machine ③ a method comprising supplying to the molten resin (A) in an extruder a compound having at least two acid anhydride groups in its molecule from a feed throat with which a cylinder of the extruder is equipped A foamed body can be produced by, for instance, the following methods when explaining with the resin composition capable of exhibiting a high melt viscoelasticity comprising the above resin (A), the above resin (B) and the above compound having at least two acid anhydride groups in its molecule as an example.

① a method comprising mixing a compound having at least two acid anhydride groups in its molecule with a pellet of the resin (A) and a pellet of the resin (B) at a temperature of at most the melting point of each component and thereafter supplying the resulting mixture to a molding machine ② a method comprising previously melting and mixing the resin (A) with the resin (B) to give a pellet, mixing this pellet with a compound having at least two acid anhydride groups in its molecule and supplying the resulting mixture to a molding machine ③ a method comprising previously melting and mixing a part of the resin (A) and a part of the resin (B), with a compound having at least two acid anhydride groups in its molecule to give a pellet, mixing this pellet with the remaining resin (A) and the remaining resin (B) and thereafter supplying the resulting mixture to a molding machine ④ a method comprising previously melting and mixing a part of the resin (A) and a compound having at least two acid anhydride groups in its molecule to give a pellet, mixing this pellet with the remaining resin (A) and the resin (B) and thereafter supplying the resulting mixture to a molding machine ⑤ a method comprising previously melting and mixing a part of the resin (B) with a compound having at least two acid anhydride groups in its molecule to give a pellet, mixing this pellet with the resin (A) and the remaining resin (B), and thereafter supplying the resulting mixture to a molding machine ⑥ a method comprising supplying to the molten resin (A) and resin (B) in an extruder a compound having at least two acid anhydride groups in its molecule from a feed throat with which a cylinder of the extruder is equipped and melting and mixing the resulting mixture Among the above methods, the method of ② is preferable from the viewpoint that a resin composition in which the branching component is previously uniformly dispersed can be prepared. On the other hand, the method of ⑥ is preferable from the viewpoint of simplification of a process.

As the above blowing agent, a blowing agent usually used as a physical blowing agent (a blowing agent having a vaporizing or expanding property by heating) can be used.

As typical examples of the blowing agent, there can be cited, for instance, inert gases, saturated aliphatic hydrocarbons, saturated alicyclic hydrocarbons, aromatic hydrocarbons, halogenated hydrocarbons, ethers, ketones and the like. As concrete examples of the blowing agent, there can be cited, for instance, inert gases such as carbonic acid gas and nitrogen, saturated aliphatic hydrocarbons such as methane, ethane, normal butane, isobutane, normal pentane, isopentane, neopentane, normal hexane, 2-methylpentane, 3-methylpentane, 2,2-dimethylbutane and 2,3-dimethylbutane, saturated alicyclic hydrocarbons such as methylcyclopropane, cyclopentane, ethylcyclobutane and 1,1,2-trimethylcyclopropane, aromatic hydrocarbons such as benzene, halogenated hydrocarbons such as trichloromonofluoromethane, dichlorofluoromethane, monochlorodifluoromethane, trichlorotrifluoroethane and dichlorotetrafluoroethane, ethers such as dimethyl ether and 2-ethoxyethanol, ketones such as acetone, methyl ethyl ketone and acetylacetone, and the like. These can be used alone or in an admixture thereof.

Furthermore, in the present invention, stabilizer, nucleating agent such as talc, pigment, filler, flame retardant, antistatic agent or the like may be used as occasion demands.

It is desired that a foamed body produced by the process of the present invention has a density of at most 0.3 g/cm$^3$ so that the foamed body is suitably used for, e.g., a heat-resistant container, a heat-insulating container, a cushioning and wrapping material and the like. The density of the foamed body can be adjusted by, for instance, adjusting the amount of a blowing agent.

Next, the present invention is more specifically explained on the basis of the Examples. However, the present invention is not limited to only the Examples.

EXAMPLES 1

Polycondensation of polyethylene terephthalate having a limiting viscosity of 0.65 dl/g and glycerol was carried out in a molten state in accordance with a usual method to give a branched aromatic copolyester resin containing glycerol units in the ratio of 3 moles per 100 moles in total of terephthalic acid units and having a limiting viscosity of 0.73 dl/g. The obtained branched aromatic copolyester resin was dried in a dehumidifying drier at 140° C. for 4 hours. Then, 60 g of the branched aromatic copolyester resin was mixed with 0.3 g of pyromellitic dianhydride by means of a ribbon blender to give a resin composition capable of exhibiting a high melt viscoelasticity.

Next, the obtained resin composition was supplied to a plastomil (made by Toyo Seiki Seisaku-Sho, Ltd., type 30C-150), molten and mixed under the following conditions. The change of kneading torque with the passage of time according to the change of the melt viscoelasticity of the resin composition was examined by means of a plastomil (temperature of a cavity: 270° C., revolutions of a kneading rotor: 100 rpm). The results are shown as the numeral 1 in FIG. 1.

Also, the melt viscosity of the resin composition after kneading for 10 minutes by means of a plastomil under the same conditions as the above (measuring temperature: 280° C., shear rate measured: 60.8 second$^{-1}$) was measured by means of a Capirograph (made by Toyo Seiki Seisaku-Sho, Ltd. ). The results are shown in Table 1.

EXAMPLE 2

A resin composition capable of exhibiting a high melt viscoelasticity was obtained in the same manner as in Example 1 except that the amount of pyromellitic dianhydride was changed to 0.12 g in Example 1.

The change of kneading torque with the passage of time according to the change of the melt viscoelasticity of the obtained resin composition was examined in the same manner as in Example 1. The results are shown as the numeral 2 in FIG. 1.

Also, the melt viscosity thereof after kneading for 10 minutes was measured in the same manner as in Example 1. The results are shown in Table 1.

EXAMPLE 3

A resin composition capable of exhibiting a high melt viscoelasticity was obtained in the same manner as in Example 1 except that the amount 60 g of the branched aromatic copolyester resin was changed to 20 g and that 40 g of polyethylene terephthalate having a limiting viscosity of 0.65 dl/g was used in Example 1.

The change of kneading torque with the passage of time according to the change of the melt viscoelasticity of the obtained resin composition was examined in the same manner as in Example 1. The results are shown as the numeral 3 in FIG. 1.

Also, the melt viscosity thereof after kneading for 10 minutes was measured in the same manner as in Example 1. The results are shown in Table 1.

EXAMPLE 4

Polycondensation of polyethylene terephthalate having a limiting viscosity of 0.65 dl/g and glycerol was carried out in a molten state in accordance with a usual method to give a branched aromatic copolyester resin containing glycerol units in the ratio of 1 mole per 100 moles in total of terephthalic acid untis and having a limiting viscosity of 0.3 dl/g. The obtained branched aromatic copolyester resin was dried in a dehumidifying drier at 140° C. for 4 hours. Then, 60 g of the branched aromatic copolyester resin was mixed with 0.3 g of pyromellitic dianhydride by means of a ribbon blender to give a resin composition capable of exhibiting a high melt viscoelasticity.

The change of kneading torque with the passage of time according to the change of the melt viscoelasticity of the obtained resin composition was examined in the same manner as in Example 1. The results are shown as the numeral 4 in FIG. 1.

Also, the melt viscosity thereof after kneading for 10 minutes was measured in the same manner as in Example 1. The results are shown in Table 1.

EXAMPLE 5

A resin composition capable of exhibiting a high melt viscoelasticity was obtained in the same manner as in Example 3 except that the amount of pyromellitic acid dianhydride was changed to 0.18 g in Example 3.

The change of kneading torque with the passage of time according to the change of the melt viscoelasticity of the obtained resin composition was examined in the same manner as in Example 1. The results are shown as the numeral 5 in FIG. 1.

Also, the melt viscosity thereof after kneading for 10 minutes was measured in the same manner as in Example 1. The results are shown in Table 1.

COMPARATIVE EXAMPLE 1

A resin composition was obtained in the same manner as in Example 1 except that 60 g of polyethylene terephthalate having a limiting viscosity of 0.65 dl/g (the same as polyethylene terephthalate used in Example 3) was used instead of 60 g of the branched aromatic copolyester resin in Example 1. The change of kneading torque with the passage of time according to the change of the melt viscoelasticity of the obtained resin composition was examined in the same manner as in Example 1. The results are shown as the numeral 6 in FIG. 1.

Also, the melt viscosity thereof after kneading for 10 minutes was measured in the same manner as in Example 1. The results are shown in Table 1.

COMPARATIVE EXAMPLE 2

A resin composition was obtained in the same manner as in Comparative Example 1 except that 0.12 g of anhydrous sodium carbonate was added thereto in Comparative Example 1. The change of kneading torque with the passage of time according to the change of the melt viscoelasticity of the obtained resin composition was examined in the same manner as in Example 1. The results are shown as the numeral 7 in FIG. 1.

Also, the melt viscosity thereof after kneading for 10 minutes was measured in the same manner as in Example 1. The results are shown in Table 1.

COMPARATIVE EXAMPLE 3

A resin composition was obtained in the same manner as in Comparative Example 2 except that polyethylene terephthalate having a limiting viscosity of 0.85 dl/g was used instead of polyethylene terephthalate having a limiting viscosity of 0.65 dl/g in Comparative Example 2. The change of kneading torque with the passage of time according to the change of the melt viscoelasticity of the obtained resin composition was examined in the same manner as in Example 1. The results are shown as the numeral 8 in FIG. 1.

Also, the melt viscosity thereof after kneading for 10 minutes was measured in the same manner as in Example 1. The results are shown in Table 1.

COMPARATIVE EXAMPLE 4

Sixty grams of the branched aromatic copolyester resin used in Example 1 was dried in a dehumidifying drier at 140° C. for 4 hours and thereafter supplied to a plastomil. The change of kneading torque with the passage of time according to the change of the melt viscoelasticity was examined in the same manner as in Example 1. The results are shown as the numeral 9 in FIG. 1.

Also, the melt viscosity thereof after kneading for 10 minutes was measured in the same manner as in Example 1. The results are shown in Table 1.

TABLE 1

| Example No. | Melt viscosity [$10^3$ pa · s] |
|---|---|
| 1 | 3.4 |
| 2 | 1.9 |
| 3 | 2.2 |
| 4 | 2.0 |
| 5 | 1.8 |
| Comparative Example | |
| 1 | 0.9 |
| 2 | 0.9 |
| 3 | 1.0 |
| 4 | 0.1 |

Ingredients of the resin compositions prepared in Examples 1 to 5 and Comparative Examples 1 to 4 are shown in Table 2.

TABLE 2

| | Ingredients of resin composition (g) | | | | | |
|---|---|---|---|---|---|---|
| | Branched aromatic polyester resin | | Polyethylene terephthalate | | | |
| | Branching component: 3% by mole Limiting viscosity: 0.73 dl/g | Branching component: 1% by mole Limiting viscosity: 0.53 dl/g | Limiting viscosity: 0.65 dl/g | Limiting viscosity: 0.85 dl/g | Pyromellitic dianhydride | Sodium carbonate |
| Ex. No. | | | | | | |
| 1 | 60 | — | — | — | 0.3 | — |
| 2 | 60 | — | — | — | 0.12 | — |
| 3 | 20 | — | 40 | — | 0.3 | — |
| 4 | — | 60 | — | — | 0.3 | — |
| 5 | 20 | — | 40 | — | 0.18 | — |
| Com. Ex. | | | | | | |
| 1 | — | — | 60 | — | 0.3 | — |
| 2 | — | — | 60 | — | 0.3 | 0.12 |
| 3 | — | — | — | 60 | 0.3 | 0.12 |
| 4 | 60 | — | — | — | — | — |

From the results shown as the numeral 6 in FIG. 1 (Comparative Example 1), it is understood that the degree of the increase of the viscoelasticity of the resin composition comprising a linear polyethylene terephthalate and pyromellitic dianhydride is small during melting. Furthermore, from the results shown as the numeral 7 in FIG. 1 (Comparative Example 2) and the numeral 8 in FIG. 1 (Comparative Example 3), it is understood that the degree of the increase of the viscoelasticity becomes high but the lowering of the viscosity due to the continuation of kneading is remarkable when sodium carbonate is added to the resin composition or when polyethylene terephthalate having a high limiting viscosity is used in the resin composition.

On the contrary, from the results shown as the numerals 1 to 5 in FIG. 1 (Examples 1 to 5), it is understood that the viscoelasticity of the mixture during melting can be largely increased when a resin composition capable of exhibiting a high melt viscoelasticity, in which the aromatic copolyester resin containing the branching component unit is incorporated, is used, and that the kneading torque is not so lowered even when melting and kneading are continued.

Also, from the results shown in Table 1, it is understood that the resin composition capable of exhibiting a high melt viscoelasticity of the present invention, comprising a specific aromatic copolyester resin and a compound having at least two acid anhydride groups in its molecule, maintains a high melt viscosity.

EXAMPLE 6

An aromatic copolyester resin containing glycerol units in the ratio of 3 moles per 100 moles in total of terephthalic acid units (limiting viscosity 0.73 dl/g) was obtained in the same manner as in Example 1.

Next, a mixture of 5 kg of the obtained aromatic copolyester resin and 10 kg of polyethylene terephthalate having a limiting viscosity of 0.65 dl/g was dried in a dehumidifying drier at 140° C. for 4 hours. Then, 75 g of pyromellitic dianhydride and 90 g of talc were added thereto and mixed by means of a ribbon blender. The obtained resin composition capable of exhibiting a high melt viscoelasticity was supplied to an extruder equipped with a nozzle having a bore diameter of 4 mmn, molten and mixed. Isopentane was poured in the ratio of 2.5 g/100 g (molten resin 100 g, hereinafter referred to the same) to the obtained molten mixture. The resulting mixture was extruded from the nozzle into the atmosphere under the conditions of the temperature of an extruder: 270° to 290° C., the temperature of an extrusion head: 275° to 285° C. and an extruding ratio: 12 kg/hour to give a rod-shaped foamed body.

The density, expansion ratio and diameter of the obtained foamed body were examined in accordance with the following methods. The results are shown in Table 3. Moreover, the obtained foamed body was excellent in cushioning property, mechanical properites and heat resistance. (Density)

The rod-shaped foamed body was cut into a length of 20 cm, and the density was measured by a dipping method with water. (Expansion ratio)

1.40 (density of a resin before foaming)/density of a foamed body (Diameter)

The average of two diameters of a cross section of the rod-shaped foamed body, the diameters being at right angles with each other.

EXAMPLE 7

A rod-shaped foamed body was obtained in the same manner as in Example 4 except that the amount of pyromellitic dianhydride was changed to 45 g and that the amount of isopentane was changed to 2.2 g/100 g based upon the molten mixture in Example 6.

The density, expansion ratio and diameter of the obtained foamed body were measured in the same manner as in Example 6. The results are shown in Table 3. Moreover, the obtained foamed body was also excellent in cushioning property, mechanical properties and heat resistance.

COMPARATIVE EXAMPLE 5

Ten kg of polyethylene terephthalate having a limiting viscosity of 0.65 dl/g was dried in a dehumidifying drier at 140° C. for 4 hours. Then, 50 g of pyromellitic dianhydride and 60 g of talc were added thereto and mixed by means of a ribbon blender. The obtained resin composition was supplied to an extruder, molten and mixed. Isopentane was poured in the ratio of 2.6 g/100 g to the obtained molten mixture. The resulting mixture was extruded from the nozzle into the atmosphere under the same conditions as in Example 6 to give a rod-shaped foamed body.

The density, expansion ratio and diameter of the obtained foamed body were measured in the same manner as in Example 6. The results are shown in Table 3.

COMPARATIVE EXAMPLE 6

Ten kg of polyethylene terephthalate having a limiting viscosity of 0.65 dl/g was dried in a dehumidifying drier at 140° C. for 4 hours. Then, 50 g of pyromellitic dianhydride, 20 g of anhydrous sodium carbonate and 60 g of talc were added thereto and mixed by means of a ribbon blender. The obtained resin composition was supplied to an extruder, molten and mixed. Isopentane was poured in the ratio of 2.6 g/100 g to the obtained molten mixture, and the resulting mixture was extruded from the nozzle into the atmosphere under the same conditions as in Example 6 to give a rod-shaped foamed body.

The density, expansion ratio and diameter of the obtained foamed body were measured in the same manner as in Example 4. The results are shown in Table 3.

COMPARATIVE EXAMPLE 7

A rod-shaped foamed body was obtained in the same manner as in Comparative Example 6 except that polyethylene terephthalate having a limiting viscosity of 0.85 dl/g was used instead of polyethylene terephthalate having a limiting viscosity of 0.65 dl/g and that the amount of isopentane was changed to 2.5 g/100 g based upon the molten mixture in Comparative Example 6.

The density, expansion ratio and diameter of the obtained foamed body were measured in the same manner as in Example 6. The results are shown in Table 3.

TABLE 3

|  | Properties of foamed body | | |
| --- | --- | --- | --- |
|  | Density (g/cm$^3$) | Expansion ratio (times) | Diameter (mm) |
| Example No. | | | |
| 6 | 0.08 | 17.5 | 22 |
| 7 | 0.20 | 7.0 | 13 |
| Comparative Example | | | |
| 5 | 0.40 | 3.5 | 8 |
| 6 | 0.36 | 3.9 | 8 |
| 7 | 0.34 | 4.1 | 9 |

From the results shown in the above, it is understood that the process for producing a foamed body of the present invention is a method for stably giving a foamed body which is excellent in moldability and has a high expansion ratio.

INDUSTRIAL APPLICABILITY

According to the process for producing an aromatic polyester resin foamed body of the present invention, a foamed body having uniform and fine cells, a high expansion ratio and excellent cushioning properties, mechanical properties and heat resistance is stably obtained. Therefore, the obtained foamed body can be suitably used as a heat-resistant container, a heat-insulating container, a cushioning

We claim:

1. A resin composition capable of exhibiting a high melt viscoelasticity comprising 100 parts by weight of an aromatic copolyester resin which contains a branching component unit having at leas three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule.

2. The resin composition capable of exhibiting a high melt viscoelasticity of claim 1, which contains a branching component unit having at least three ester-forming groups in the ratio of 0.1 to 3 moles per 100 moles in total of the aromatic dicarboxylic acid units.

3. The resin composition capable of exhibiting a high melt viscoelasticity of claim 1, wherein the branching component is glycerol.

4. A process for producing an aromatic polyester resin foamed body, characterized by melting a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 part by weight of a compound having at least two acid anhydride groups in its molecule, thereafter mixing the resulting melt with a blowing agent, then extruding the resulting mixture into a low pressure zone and foaming the mixture.

5. The process for producing an aromatic polyester resin foamed body of claim 4, in which a branching component unit having at least three ester-forming groups is contained in the ratio of 0.1 to 3 moles per 100 moles in total of the aromatic dicarboxylic acid units.

6. The process for producing an aromatic polyester resin foamed body of claim 4, wherein the branching component is glycerol.

7. An aromatic polyester resin foamed body having a density of at most 0.3 g/cm$^3$, which is obtained by melting a resin composition capable of exhibiting a high melt viscoelasticity comprising 100 parts by weight of an aromatic copolyester resin which contains a branching component unit having at least three ester-forming groups in the ratio of 0.01 to 5 moles per 100 moles in total of aromatic dicarboxylic acid units and which has a limiting viscosity of 0.4 to 1.0 dl/g, and 0.05 to 5 parts by weight of a compound having at least two acid anhydride groups in its molecule, thereafter mixing the resulting melt with a blowing agent, then extruding the resulting mixture into a low pressure zone and foaming the mixture.

* * * * *